US 8,898,792 B1
Nov. 25, 2014

(12) United States Patent
Fall

(54) SEARCH MECHANISM FOR CONTENT BASED INFORMATION SECURITY REPOSITORIES

(75) Inventor: Thomas C. Fall, Los Gatos, CA (US)

(73) Assignee: Lockheed Martin Corporation, Bethesda, MD (US)

(*) Notice: Subject to any disclaimer, the term of this patent is extended or adjusted under 35 U.S.C. 154(b) by 1639 days.

(21) Appl. No.: 11/156,354

(22) Filed: Jun. 17, 2005

(51) Int. Cl.
*G06F 21/10* (2013.01)
*H04N 21/4405* (2011.01)

(52) U.S. Cl.
USPC .............. 726/26; 726/27; 726/30; 707/706; 707/707; 707/705

(58) Field of Classification Search
CPC .............. H04L 12/40104; H04L 29/06551; H04L 29/06659; G06F 17/30864; G06F 17/30129
USPC .................... 382/100, 241; 707/999; 709/201
See application file for complete search history.

(56) References Cited

U.S. PATENT DOCUMENTS

| | | | |
|---|---|---|---|
| 6,976,165 B1* | 12/2005 | Carpentier et al. | 713/165 |
| 2002/0023084 A1* | 2/2002 | Eyal et al. | 707/3 |
| 2002/0114013 A1* | 8/2002 | Hyakutake et al. | 358/3.28 |
| 2004/0022390 A1* | 2/2004 | McDonald et al. | 380/277 |
| 2004/0158553 A1* | 8/2004 | Keller | 707/3 |
| 2005/0138110 A1* | 6/2005 | Redlich et al. | 709/201 |

OTHER PUBLICATIONS

Dong et al., Quantitative evaluation of recall and precision of CAT Crawler, a search engine specialized on retrieval of Critically Appraised Topics, 2004.*

* cited by examiner

*Primary Examiner* — Peter Poltorak
*Assistant Examiner* — Huan V Doan
(74) *Attorney, Agent, or Firm* — Oblon, Spivak, McClelland, Maier & Neustadt, L.L.P.

(57) ABSTRACT

A secure search mechanism (or search engine) for use with content based information security repositories. The present invention may be embodied in an information security system or method. In accordance with the present invention, a search occurs in a protected device that contains classified metadata and addresses of encrypted headers relating to classified data or information objects. A search request comes in from a user in a particular access level and the search engine returns a set of addresses that are at appropriate access levels and satisfy the search criteria. These addresses are passed or transferred to another device that stores the encrypted headers, and the encrypted headers are sent to the user.

14 Claims, 2 Drawing Sheets

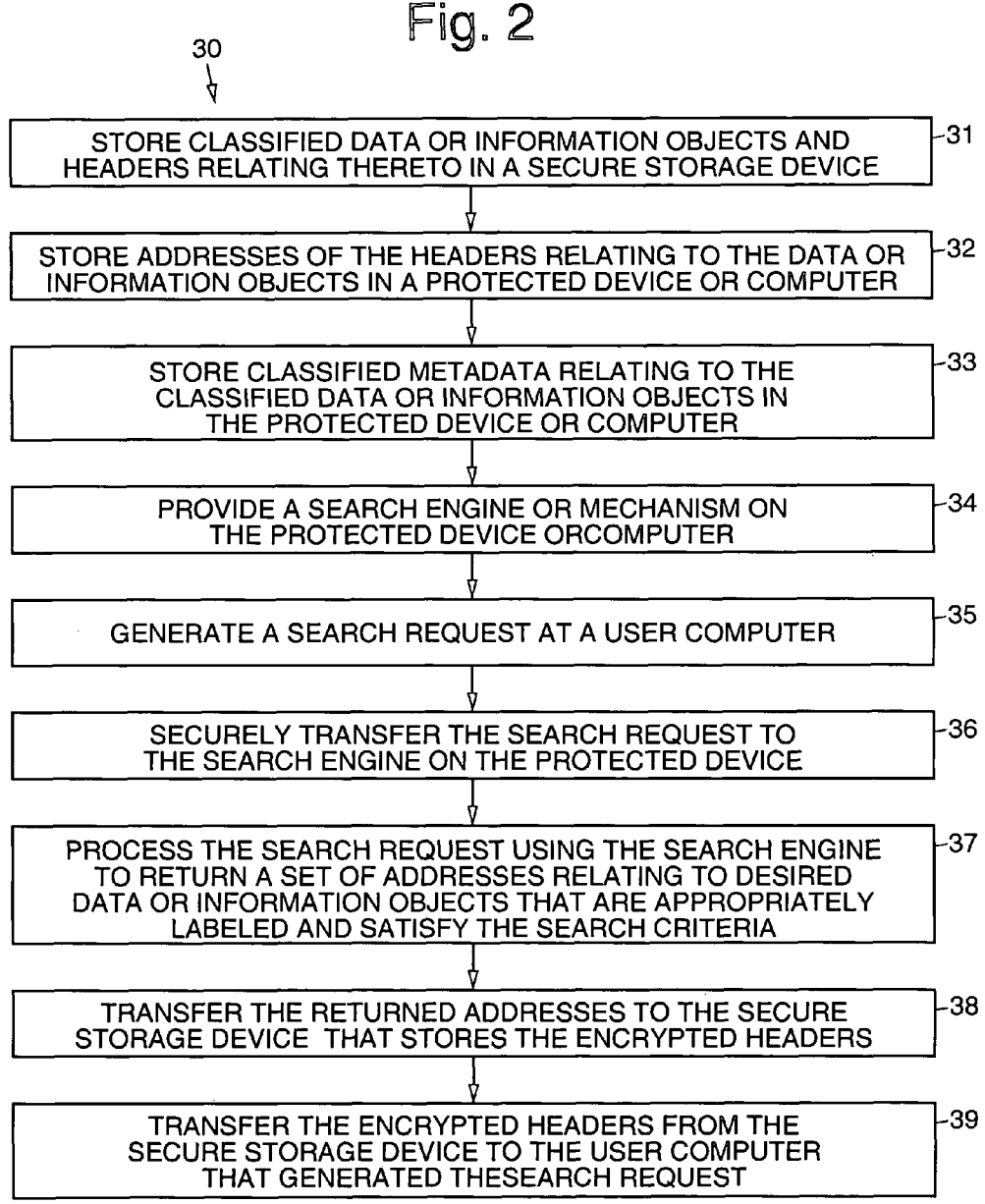

SEARCH MECHANISM FOR CONTENT BASED INFORMATION SECURITY REPOSITORIES

BACKGROUND

The present invention relates generally to information security systems and methods, and more particularly, to a search mechanism for content based information security repositories.

Content based information security (CBIS) supports multiple levels of security by storing each information object as an encrypted object. These encrypted objects can only be decrypted by users that possess an appropriate key.

The problem with conventional implementations relates to the search process. Typically search engines have a set of metadata (such as keywords) that is searched and then a short description of the searched information (encrypted information object) is passed back to a user for each "hit" found in the search.

Since this search process serves multiple levels of security, a problem exists wherein, if the metadata is multilevel, then there is a danger that higher level information might be inadvertently disclosed. Even if the metadata and descriptions are unclassified, the existence of a higher level information object associated with the request keywords might be disclosed.

It would be desirable to overcome these problems to provide for a secure mechanism for searching for information.

BRIEF DESCRIPTION OF THE DRAWINGS

The various features and advantages of disclosed embodiments may be more readily understood with reference to the following detailed description taken in conjunction with the accompanying drawings, wherein like reference numerals designate like structural elements, and in which:

FIG. 2 is a flow diagram that illustrates an exemplary method.

DETAILED DESCRIPTION

Figure 1:
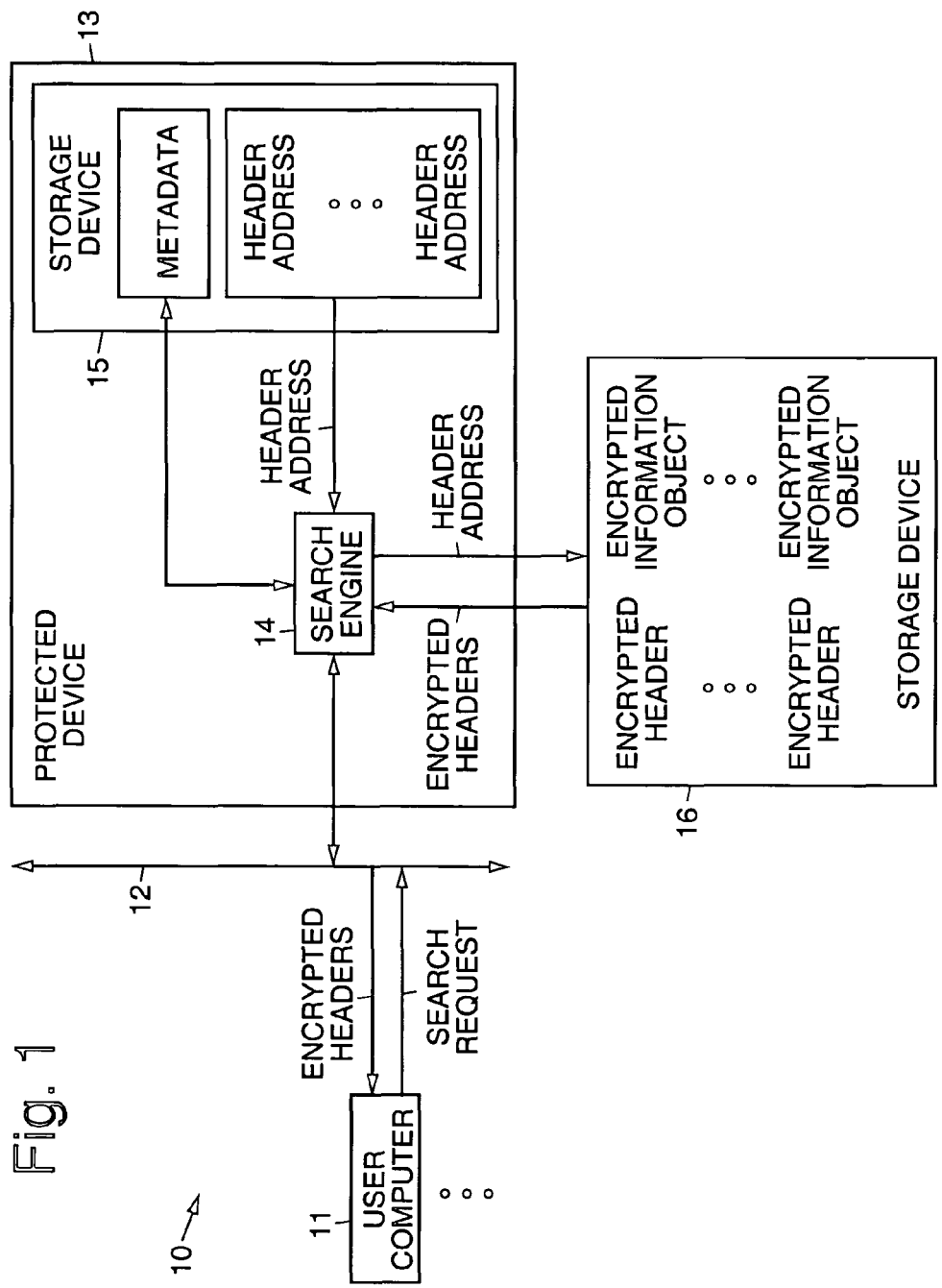
FIG. 1 illustrates an exemplary system.

Referring to the drawing figures, FIG. 1 illustrates an exemplary system 10 that comprises one or more user computers 11 that securely communicate over a network 12 with a protected device 13 or computer 13. The protected device 13 stores classified metadata (such as keywords) that relate to encrypted data or information objects, and addresses of encrypted headers relating to the encrypted data or information objects. A header is a unit of information that precedes a data or information object and provides a human readable summary. The protected device 13 is coupled to a secure storage device 16 that stores the encrypted headers along with the encrypted data or information objects.

The protected device 13 comprises a search engine 14 or mechanism 14 that interfaces with the one or more user computers 11. A search request generated at a user computer 11 is transferred to the protected device 13 with a particular access level. The search engine 14 processes the search request and returns a set of addresses corresponding to headers associated with desired data or information objects that are appropriate to that access level and satisfy the search criteria.

A storage device 15 stores an array of metadata linked to an array of addresses. That is, each address has a set of metadata that pertains to the information object the address points to. One of these metadata items is the access level required to access that information object. Only those addresses with appropriate access levels for that user participate in the rest of the search process, so the search engine sees only the subset of the metadata array that is associated to those addresses. The addresses (header addresses) are transferred to the storage device 16 that stores the encrypted headers, and the encrypted headers are read out of the secure storage device 16 and transferred to the user computer 11 that generated the search request.

FIG. 2 is a flow diagram that illustrates an exemplary method 30 that comprises the following actions.

Classified encrypted data or information objects and encrypted headers relating thereto are stored 31 in a secure storage device 16. Classified metadata (such as keywords) relating to the classified data or information objects is stored 32 in a protected device 13 or computer 13. Addresses of headers relating to the data or information objects are stored 33 in the protected device 13 or computer 13. A search engine 14 or mechanism 14 is provided 34 on the protected device 13 or computer 13.

A search request is generated 35 at a user computer 11 which is at a particular access level. The search request is transferred 36 to the search engine 14 on the protected device 13. The search engine 14 processes 37 the search request and returns a set of addresses relating to desired data or information objects that are at the appropriate access levels and satisfy the search criteria. The returned addresses are transferred 38 to the secure storage device 15 that stores the encrypted headers. The encrypted headers identified by the returned addresses are transferred 39 to the user computer 11 that generated the search request.

Thus, an improved search mechanism (or search engine) for use with content based information security repositories has been disclosed, and which may be embodied in an information security system or method. In summary, a search occurs in a protected device 13 that contains classified metadata (such as keywords) and addresses of encrypted headers relating to classified data or information objects. A search request comes in from a user in a particular access level and the search engine 14 returns a set of addresses that refer to information objects that within that access level and that satisfy the search criteria. These addresses are passed or transferred to another device 15 where the encrypted headers are stored, and the encrypted headers are sent to the user.

In the disclosed system and method, there is no instance of both unencrypted and encrypted material that are co resident. The system and method physically separates the metadata from the encrypted information (data or information objects) with only an address connecting them. The address gives no clue regarding the content of the information objects.

Thus, improved information security systems and methods comprising a search mechanism for providing content based information security has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:
1. An information security system comprising:
a network;
a secure storage device that stores encrypted data and encrypted headers relating to the encrypted data;
a protected device comprising a storage device that stores classified unencrypted metadata relating to the encrypted data and addresses of the encrypted headers relating to the encrypted data, the protected storage device being physically separate from the secure storage device;

a user computer that securely communicates at a particular access level over the network with the protected device and generates a search request relating to the encrypted data;

a search engine disposed on the protected device that interfaces with the user computer to process the search request to return a set of addresses corresponding to headers associated with desired data that are at the particular access level and satisfy the search request, transfers the set of addresses to the secure storage device that stores the encrypted headers, and transfers the encrypted headers without the encrypted data to the user computer that generated the search request, wherein the storage device of the protected device does not store the encrypted data, wherein there is no instance of the encrypted data in the protected device, and wherein the protected device is accessible only by a user having the particular access level, the particular access level being one of a plurality of access levels.

2. A secure information processing method comprising the steps of:

storing classified information and encrypted headers relating thereto in a secure storage device;

storing classified unencrypted metadata relating to the classified information in a protected device that is physically separate from the secure storage device;

storing addresses of the encrypted headers relating to the classified information in the protected device that is physically separate from the secure storage device;

providing a search engine on the protected device;

generating a search request on a user computer which is at a particular access level;

transferring the search request to the search engine;

processing the search request using the search engine to return a set of addresses relating to desired information that are at the particular access level and satisfy the search request;

transferring the returned set of addresses to the secure storage device; and transferring the encrypted headers, corresponding to the returned set of addresses from the secure storage device, without the classified information to the user computer that generated the search request, wherein the storage device of the protected device does not store the encrypted data, wherein there is no instance of the classified information in the protected device, and wherein the protected device is accessible only by a user having the particular access level, the particular access level being one of a plurality of access levels.

3. The information security system of claim 1, wherein the secure storage device is included within a content based information security repository.

4. The secure information processing method of claim 2, wherein the secure storage device is included within a content based information security repository.

5. The information security system of claim 1, wherein the classified unencrypted metadata includes the particular access level required to access the encrypted data related to the classified metadata.

6. The secure information processing method of claim 2, wherein the classified unencrypted metadata includes the particular access level required to access the classified information related to the classified metadata.

7. The information security system of claim 1, wherein the encrypted headers include a human readable summary.

8. The secure information processing method of claim 2, wherein the encrypted headers include a human readable summary.

9. The information security system of claim 1, wherein the secure storage device is accessible only by the protected device having the particular access level.

10. The secure information processing method of claim 2, wherein the secure storage device is accessible only by the protected device having the particular access level.

11. The information security system of claim 1, wherein the addresses provide no suggestion as to a content of the encrypted data.

12. The secure information processing method of claim 2, wherein the addresses provide no suggestion as to a content of the classified information.

13. The information security system of claim 1, wherein the protected device is directly coupled to the secure storage device.

14. The secure information processing method of claim 2, wherein the protected device is directly coupled to the secure storage device.

* * * * *